Jan. 11, 1966     G. BERRY ET AL     3,228,675
DRIVE MECHANISM
Filed March 26, 1962     3 Sheets-Sheet 1
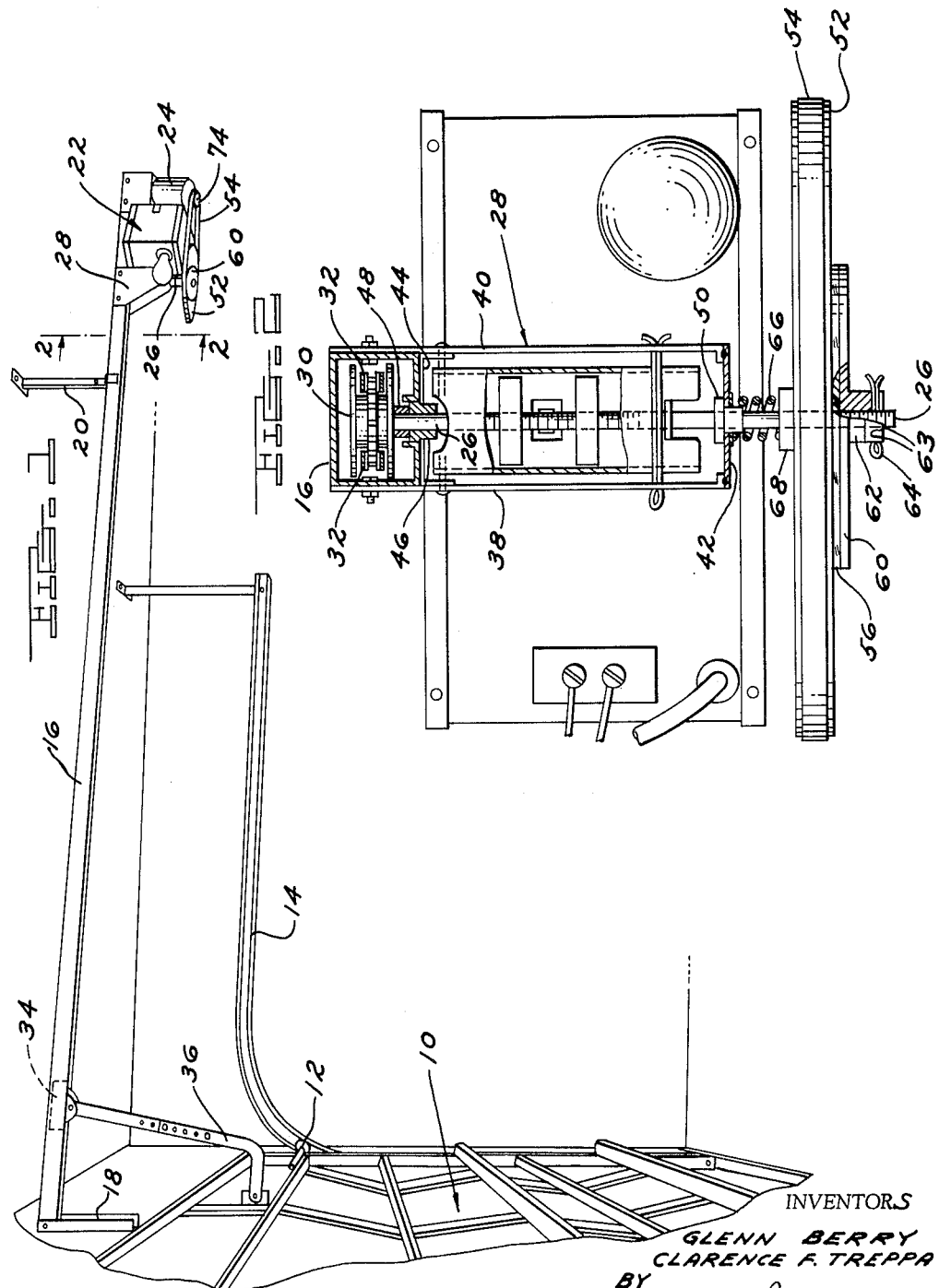
INVENTORS
GLENN BERRY
CLARENCE F. TREPPA
BY
Barnes, Kisselle, Raisch & Choate
ATTORNEYS Jan. 11, 1966 G. BERRY ET AL 3,228,675
DRIVE MECHANISM
Filed March 26, 1962 3 Sheets-Sheet 2
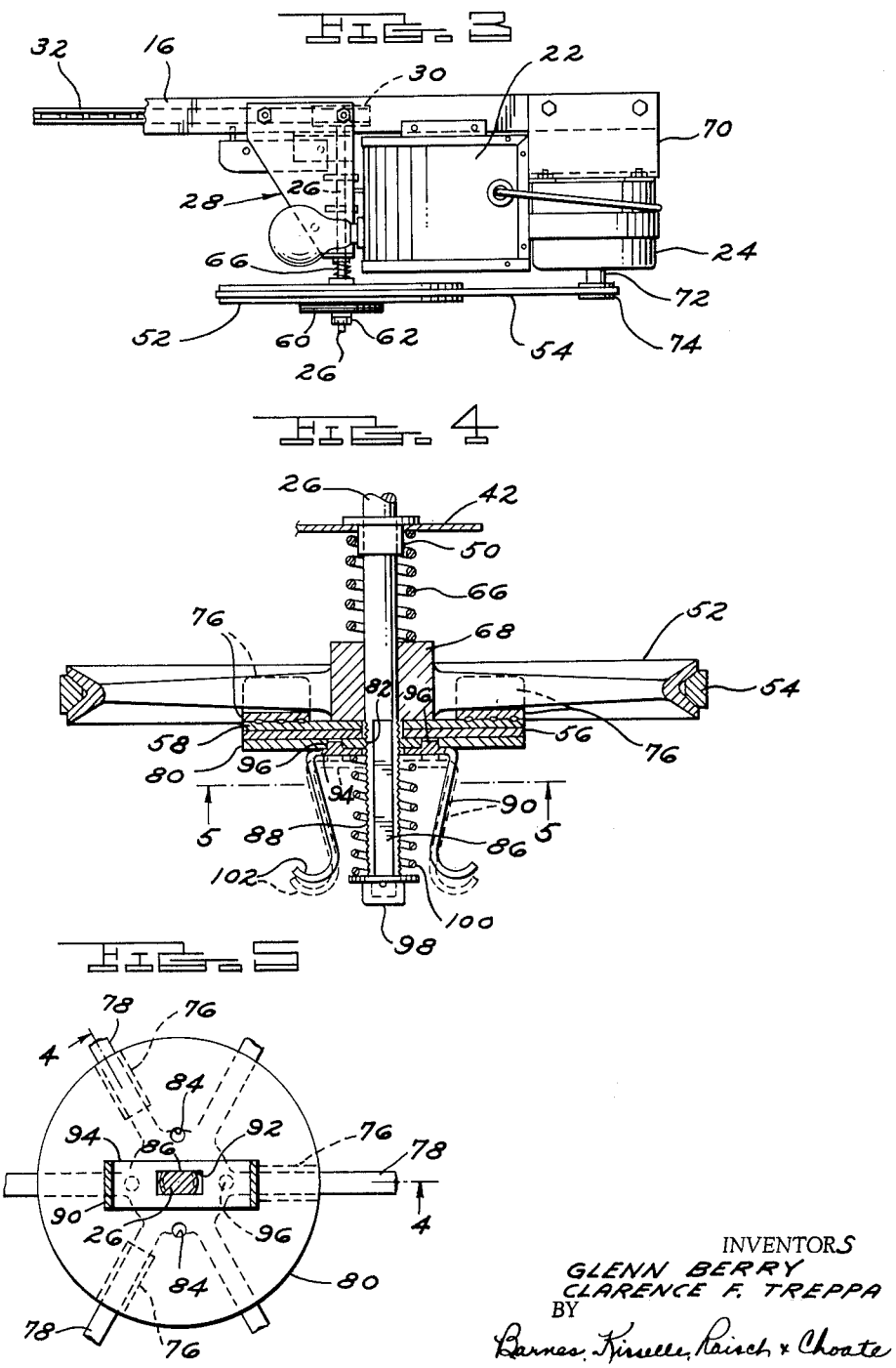
INVENTORS
GLENN BERRY
CLARENCE F. TREPPA
BY
Barnes, Kisselle, Raisch & Choate
ATTORNEYS Jan. 11, 1966    G. BERRY ET AL    3,228,675
DRIVE MECHANISM
Filed March 26, 1962    3 Sheets-Sheet 3
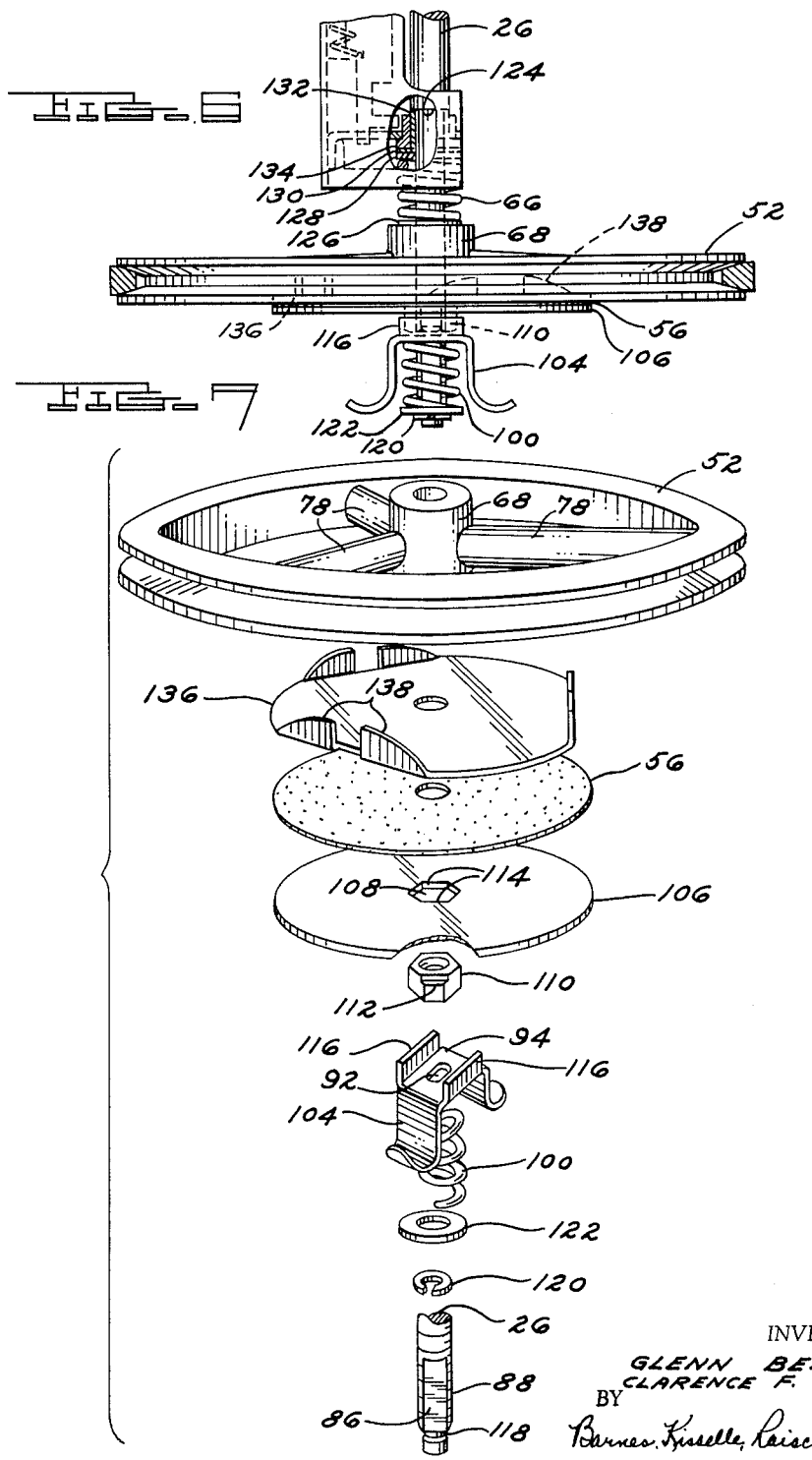
INVENTORS
GLENN BERRY
CLARENCE F. TREPPA
BY
Barnes, Kisselle, Raisch & Choate
ATTORNEYS United States Patent Office 3,228,675
Patented Jan. 11, 1966

3,228,675
DRIVE MECHANISM
Glenn Berry, Birmingham, and Clarence F. Treppa, Royal Oak, Mich., assignors, by direct and mesne assignments, to The Stanley Works, New Britain, Conn., a corporation of Connecticut
Filed Mar. 26, 1962, Ser. No. 182,391
12 Claims. (Cl. 268—59)

This invention relates generally to drive mechanisms, and more particularly to a clutch mechanism for use in automatic door operating mechanisms for overhead type doors.

Electrically powered door operating mechanisms are known in the art for opening and closing overhead type doors such as those commonly used in garages and buildings wherein the door is supported on tracks for movement between a vertical closed position and a horizontal open position. Slipping clutch mechanisms have been used in such door operating mechanisms in order to prevent injury to the electric motor and to objects blocking the movement of the door. However, known clutch mechanisms are often difficult for the average untrained person to install and/or adjust, and are often too complicated and costly to be commercially successful in the residential market.

An object of the present invention is to provide an improved clutch mechanism which is easily and accurately adjustable for setting the amount of power transmitted by the clutch mechanism.

Another object is to provide an improved drive mechanism for an electrically powered door operator which is easily assembled and installed by relatively unskilled labor, and when once installed is readily accessible for servicing and adjustment.

Still another object is to provide an improved slipping clutch adapted for use with a door operating mechanism which is economical to construct and reliable over a long operating life.

Yet another object is to provide an improved clutch mechanism for use with a door operating mechanism which permits a sensitive adjustment of the power output of the door operating mechanism with a minimum of effort so that the door operating mechanism can be readily maintained for safe operation.

In the accompanying drawings:

FIG. 1 is a perspective elevational view of a door operator including a drive mechanism constructed in accordance with the present invention and installed for use with a conventional sectional overhead garage door.

FIG. 2 is a front elevational view of the drive mechanism taken in section on line 2—2 of FIG. 1 and with a portion broken away to illustrate one form of slipping clutch mechanism of the invention.

FIG. 3 is a fragmentary elevational view illustrating the arrangement of the drive mechanism of FIGS. 1 and 2.

FIG. 4 is a fragmentary elevational view of a modified form of clutch mechanism taken in section on the line 4—4 of FIG. 5.

FIG. 5 is a fragmentary bottom plan view of the modified clutch mechanism taken in section on the line 5—5 of FIG. 4.

FIG. 6 is a fragmentary elevational view of another modified form of clutch mechanism with a portion broken away to illustrate details.

FIG. 7 is an exploded perspective view of the modified clutch mechanism of FIG. 6.

Referring to FIG. 1 in the accompanying drawings, the door operator embodying the drive mechanism of the present invention is shown completely assembled and installed for use with a conventional sectional overhead garage door 10 which is supported along the side edges thereof by rollers 12 which run in a pair of guide tracks 14, only one of which is shown inasmuch as construction and operation of this type of door is well understood in the art. Reference may be had to a co-pending application Serial No. 95,301, filed March 13, 1961, by Glenn Berry and others for further details of the door operator illustrated herein. In brief, the door operator includes a tubular track 16 supported at the front end thereof by a channel 18 which is bolted to the header beam of the garage above the top center of the door opening. Track 16 is supported near the other end thereof by a slidably adjustable hanger strap 20 bolted to the ceiling or rafter of the garage. A combined radio receiver-motor control unit 22 is suspended from track 16 rearwardly of hanger strap 20 for controlling electrical power to an electric motor 24 also suspended from track 16 adjacent unit 22.

The improved drive mechanism of the present invention includes motor 24 which is connected, via a slipping clutch of the invention, in driving relation with a vertical shaft or spindle 26 which is journalled for rotation within a bracket 28 mounted adjacent the front of unit 22. The upper end of spindle 26 drives a sprocket 30 (FIG. 2) around which is trained a flexible element 32, such as a roller chain, adapted to run longitudinally within track 16 for propelling a carriage block 34 (FIG. 1) therein. Carriage 34 in turn is connected via a linkage arm 36 to the inner side of door 10 so that movement of carriage 34 raises and lowers the door.

Referring to FIG. 2, the spindle supporting bracket 28 comprises a pair of vertical side plates 38 and 40 which are fastened by suitable fasteners to the sides of tubular track 16 and which are joined at the bottom edges thereof to a cross plate 42. An inverted U-shaped upper cross plate 44 is welded to the inner sides of plates 38, 40 so as to extend therebetween adjacent the bottom wall of track 16. Plate 44 supports a flanged bushing 46 which in turn supports a spacer collar 48 on which sprocket 30 rotates and rests. Another flanged bushing 50 is supported by bottom plate 42 so as to provide the lower journal for spindle 26.

A large spoked pulley 52 is rotatably journalled on spindle 26 in an easily accessible position near the lower end of the spindle for rotation by a V-belt 54 trained around the pulley. Power is transmitted from pulley 52 to spindle 26 via a friction slipping clutch mechanism which includes a circular disc 56, made of suitable friction material, which may be fastened directly to the spokes of pulley 52 or which may frictionally engage an upper clutch plate 58 (FIG. 4) which in turn engages pulley 52. A lower clutch plate 60 and a hexagonal nut 62 integral therewith are center tapped to be threadably received on the lower threaded end of spindle 26. The spindle has a transverse hole and nut 62 has a series of depending tangs 63 to form a plurality of keyways, and a cotter pin 64 is inserted through the spindle hole and nut keyways to key the nut and hence plate 60 to spindle 26. A clutch compression spring 66 is coiled in spaced relation around spindle 26 between plate 42 and the upper face of hub 68 of pulley 52. Spring 66 provides a downward force cumulative to the weight of pulley 52 to maintain clutch disc 56 in frictional engagement with the upper surface of clutch plate 60. Hence torque is transmitted to spindle 26 via pulley 52, disc 56, plate 60, nut 62 and pin 64. The manner in which clutch engagement pressure is adjusted will become apparent from the subsequent description of the modified clutches.

As shown in FIG. 3, motor 24 is suspended from the end of track 16 by a U-shaped bracket 70 which is bolted to the sides of the track. The drive shaft 72 of motor 24 has a small driving pulley 74 affixed thereto around which V-belt 54 is trained so as to provide, with larger pulley 52, a speed reduction drive for spindle 26.

A modified form of clutch mechanism of the invention is shown in FIGS. 4 and 5 wherein elements identical to those of the clutch mechanism shown in FIGS. 2 and 3 have been given like reference numerals and the description thereof not repeated. The circular friction disc 56, preferably made of cork, is cemented to upper clutch plate 58. Plate 58 has three U-shaped brackets 76 spot welded to the upper surface thereof at 120° intervals (FIG. 5) so as to each receive a spoke 78 of pulley 52 therein. A modified lower clutch plate 80 is provided which comprises a circular metal disc having an internally threaded center hole 82 and four smaller smooth holes 84 spaced at 90° intervals radially outward from the center hole of the disc (FIG. 5). Spindle 26 is also modified by forming a pair of oppositely disposed flat surfaces 86 which extend axially upward from the bottom end of the spindle. The circular portions of the periphery of spindle 26 between flat surfaces 86 are provided with an external interrupted thread 88 for threadably receiving plate 80 on the spindle.

A modified keying means is slidably mounted on spindle 26 and comprises a U-shaped finger grip bracket 90. Bracket 90 has a flat sided center hole 92 (FIG. 5) in the horizontal center portion 94 thereof which is complemental to the cross section of the flatted portion of spindle 26 so as to be axially slidable along flat surfaces 86 but not rotatable relative to the spindle. A pair of studs 96 are secured to the transverse portion 94 of bracket 90 and project upwardly therefrom for registry with a diametrically opposite pair of the holes 84 in plate 80. A push nut 98 is detachably secured to the bottom end of spindle 26 for supporting a low pressure compression spring 100 wound in spaced relation around spindle 26 for yieldably urging bracket 90 upwardly against plate 80. The lower ends 102 of bracket 90 are reversely bent to provide a pair of finger grips.

With the above modified form of friction clutch mechanism the clutch plate engagement pressure developed by clutch spring 66 may be manually adjusted without the use of tools. Bracket 90 is merely pulled downwardly on spring 100 to the position indicated in broken lines in FIG. 4 wherein studs 96 are disengaged from plate 80, and then pulley 52 is rotated to thereby rotate plate 80 on the spindle threads 88 until it has traveled axially along the spindle the desired distance. It is to be noted that pulley 52 and plate 58 have smooth bores so as to be journalled on spindle 26 for axial as well as rotational movement relative thereto and thus are free to move axially with the threaded plate 80. Since the reaction force to the pressure of spring 66 is developed by the threaded connection of plate 80 to the spindle, plates 58 and 80 are always held frictionally engaged by spring 66 and hence will rotate with pulley 52. To increase the maximum torque transmittable by the clutch without slipping, pulley 52 is rotated clockwise so that plate 80 is threaded upwardly on spindle 26 so as to further compress spring 66.

Once the desired clutch tension is obtained bracket 90 is released, whereupon it is urged upwardly by spring 100 into engagement with plate 80. If bracket 90 is inadvertently left disengaged (with studs 96 angularly between adjacent holes 84), the first 90 degrees or less of rotation of plate 80 will bring these holes and studs into registry, whereupon spring 100 automatically drives bracket 90 into proper engagement with plate 80 so that the plate is then keyed by the bracket to spindle 26.

Another modified clutch mechanism of the present invention is shown in FIGS. 6 and 7 wherein elements identical to those of the clutch mechanism shown in FIGS. 1–5 have been given like reference numerals and the description thereof not repeated. A modified finger grip bracket 104 is provided for non-rotatably keying a modified lower clutch plate 106 to spindle 26. Plate 106 has an elongated hexagonal center hole 108 (FIG. 7) adapted to non-rotatably receive a hex drive nut 110 which is threadably received on spindle 26. Nut 110 is cut away at 112 on opposite upper corners thereof so that the vertical surfaces of the cuts fit against the longest sides 114 of hole 108, while the horizontal surfaces of the cuts provide shoulders which bear against the underside of plate 106. Bracket 104 is similar to bracket 90 except that it has a pair of upright flanges 116 bent upwardly from the horizontal portion 94 thereof which fit flat against opposite sides of nut 110 when in the engaged position of FIG. 6.

The bottom end of spindle 26 has a groove 118 to receive a snap ring 120 and a washer 122 for supporting spring 100. The lower journal structure for spindle 26 is also modified by providing a downwardly facing shoulder 124 on spindle 26 (FIG. 6) to take the thrust of spring 66. This spring bears at its ends against a nylon washer 126 and another washer 128. A spacing washer 130 and a sleeve 132 hold washer 128 spaced from shoulder 124 so that bushing 134 is relieved of spring pressure.

A simplified upper clutch plate 136 (FIG. 7) is provided in which the spoke engaging brackets are formed integral therewith by radially slotting the periphery at 120° intervals and bending the sides of the slots upwardly from the plane of the plate to form a pair of spaced ears 138 adapted to receive spoke 78 therebetween.

The clutch mechanism of FIGS. 6 and 7 is operated in the same manner as that of FIGS. 4 and 5, both forms permitting rapid adjustment of the clutch setting by inexperienced personnel without the use of tools and with very little muscular effort. Very little effort is required to pull bracket 104 downwardly out of engagement with nut 110. Pulley 52 is preferably about 10 inches in diameter and provides a convenient hand wheel with a large moment arm so that very little effort is required to rotate the pulley with one hand while bracket 104 is held in the disengaged position with the other hand. Little or no countertorque need be exerted on bracket 104 to hold spindle 26 stationary during axial adjustment of the clutch since the spindle is normally held against rotation by its connection to the garage door via drive chain 32. The motor shaft 72 is relatively free to turn and thus does not offer significant resistance to hand rotation of pulley 52 during clutch adjustment.

Clutch spring 66 is preferably a relatively low pressure spring capable of exerting about 100 pounds pressure on pulley 52 during normal operation. However, spring 66 has a relatively high rate so that when it is compressed axially $\frac{1}{10}$ of an inch from the relaxed or zero force condition thereof, the force developed by the spring is about 120 pounds. The threads on spindle 26 are preferably designed so that for about each 60 degrees of rotation of pulley 52 in a clockwise direction, spring 66 is compressed sufficiently to develop an additional 2 pounds of lineal thrust. It has been found with such an arrangement that only about $\frac{1}{8}$ of an inch of total axial travel of the clutch plates and pulley 52 is required to set the minimum and maximum power transfer limits of the clutch. Pulleys 52 and 74 are located on their respective spindle and shaft so as to be in alignment at the middle or mean clutch adjustment so that only $\frac{1}{16}$ of an inch of axial travel away from the mean position is required to reach the outer limits of clutch adjustment. This is well within the permissible maximum misalignment of pulleys 52 and 74 beyond which undue wear of the V-belt 82 would occur.

Due to the relatively large diameter of the clutch plates and friction disc (preferably about 5 inches) of the clutch mechanism of the invention, a relatively small amount of pressure is required to maintain the clutch in a non-slip condition, and also only a small amount of axial travel of the clutch is needed to vary the effective friction coefficient of the clutch. These factors contribute to the sensitivity of the clutch and permit a fine adjustment so that the clutch will slip and the garage door will stop when it encounters a resistance of one or two pounds. This characteristic is an important safety feature in an automatic door operating mechanism intended for residential use where reliance is placed on a slipping clutch to avoid injury to children or obstructions in the way of the descending door. Since no skill is required to adjust the tension of the clutch, the owner can easily from time to time re-adjust the clutch as necessary to insure that the clutch is set to pull only a pound or two more than the required effort to move the door.

The clutch mechanism of the present invention provides the above operating advantages with simple and inexpensive structure which positively locks the lower clutch plate to the spindle so that it will not travel on the spindle in spite of the fact that the drive mechanism reverses once during each cycle of operation. Due to the ease of adjusting the clutch mechanism of the present invention, it is simpler to adjust the output of the door operating mechanism than it is the door counterbalancing mechanism when it is necessary to compensate for changes in the pull required to lift the door resulting from such conditions as wear, seasonal changes and aging and settling of the building.

We claim:

1. A drive mechanism comprising a rotatable shaft, a friction clutch mechanism including driving and driven members, said driving member being mounted on said shaft for rotational and axial movement relative thereto, said driven member being threadably connected to said shaft for axial threading movement therealong, resilient means yieldably biasing said members into operative engagement and locking means for connecting said driven member in driving relation with said shaft at predetermined fixed positions along said shaft, said locking means being releasable to disconnect said driven member from driving relation with said shaft so that said clutch mechanism may be moved axially on said shaft to vary the clutch engagement pressure exerted by said resilient means, said locking means comprising a finger grip member slidably mounted on said shaft for rotation therewith, said finger grip member having means adapted for operably connecting said driven member for rotation with said finger grip member, and second resilient means for yieldably urging said finger grip member into connected relation with said driven member.

2. A clutch mechanism comprising a rotatable shaft, a drive member journalled on said shaft for rotational and axial movement relative thereto, clutch means threadably connected to said shaft for axial movement relative thereto in response to rotation relative thereto, friction means interposed between said member and said clutch means for transmitting torque therebetween, means for yieldably biasing said drive member towards said clutch means to cause operative engagement of said clutch means with said drive member via said friction means, said biasing being supported relative to said drive member such that the biasing force developed by said biasing means varies with the axial position of said drive member on said shaft, and means for selectively connecting and disconnecting said clutch means for rotation with said shaft whereby said clutch means may be disconnected and then rotated relative to said shaft to move said drive member along said shaft to thereby vary the clutch engagement pressure exerted by said resilient means, said shaft having an axially extending keyway and said connecting means comprising a finger grip bracket slidably mounted on said shaft and having a keying portion engageable with said shaft keyway for non-rotatably and slidably keying said bracket to said shaft, said bracket and said clutch means having means adapted for interengagement for connecting said clutch means to said shaft for rotation therewith, and means for yieldably urging said bracket into said interengagement with said clutch means.

3. The combination recited in claim 2 wherein said clutch means comprises a clutch plate having a smooth annular surface with a recess therein spaced radially outward from the rotational axis of said plate and said bracket has a projection extending therefrom adapted to enter said recess to thereby provide said interengagement when said bracket is urged toward said clutch means by said last mentioned means.

4. The combination recited in claim 2 wherein said clutch means comprises a disc and a drive nut in non-rotatable engagement with one another, said drive nut being threadably mounted on said shaft and having opposed flat surfaces, said bracket having a pair of spaced flanges adapted to embrace said surfaces of said drive nut to thereby provide said interengagement when said bracket is urged towards said clutch means by said resilient means.

5. In a door operating mechanism having means for operably connecting said mechanism to a door for causing movement thereof between closed and open positions, a clutch mechanism comprising a rotatable shaft operably connected in driving relation with said connecting means, a drive member journalled on said shaft for rotational and axial movement relative thereto, clutch means threadably connected to said shaft for axial movement relative thereto in response to rotation relative thereto, friction means interposed between said member and said clutch means for transmitting torque therebetween, resilient means operably connected to said shaft and said drive member for urging said drive member into operative engagement with said clutch means via said friction means with a force dependent upon the axial position of said clutch means on said shaft, and means for releasably keying said clutch means against rotation relative to said shaft, said keying means being manually disengageable from said clutch means to permit relative rotation between said clutch means and said shaft for causing relative axial movement therebetween to vary the clutch engagement pressure exerted by said resilient means.

6. A clutch mechanism comprising a rotable shaft, a drive member journalled on said shaft for rotational and axial movement relative thereto, clutch means threadably connected to said shaft for axial movement relative thereto in response to rotation relative thereto, friction means interposed between said member and said clutch means for transmitting torque therebetween, resilient means operably connected to said shaft and said drive member for urging said drive member into operative engagement with said clutch means via said friction means with a force dependent upon the axial position of said clutch means on said shaft, and means for keying said clutch means against rotation relative to said shaft, said keying means being disengageable from said clutch means to permit relative rotation between said clutch means and said shaft for causing relative axial movement therebetween to vary the clutch engagement pressure exerted by said resilient means, said keying means comprising a finger grip bracket mounted on said shaft for rotation therewith and sliding movement in the direction of the axis of said shaft, said bracket having means adapted to operably connect said clutch means for rotation with said bracket upon sliding movement of said bracket towards said clutch means, and a spring mounted on said shaft for yieldably urging said bracket into connected relation with said clutch means.

7. In an operating mechanism having means for operably connecting said mechanism to an overhead door for causing movement thereof between closed and open positions, the combination comprising a rotatable spindle operably connected in driving relation with said connecting means such that said spindle is held stationary when movement of the door is obstructed, a friction clutch including a driven member and a driving member mounted on said spindle for rotational and aixal movement relative thereto, means threadably connecting said driven member to said spindle, friction means interposed between said members for transmitting torque therebetween, a clutch spring having one end fixed relative to said spindle and the other end operably connected to bias said members into operative engagement via said friction means and keying means releasably connecting said driven member with said spindle for rotation therewith, said keying means being manually movable to disconnect said driven member from said spindle so that said driven member may be rotated while said spindle is held stationary for causing axial travel of said members to thereby vary the clutch engagement force exerted by said clutch spring.

8. The combiation recited in claim 7 wherein said driving member has a relatively large diameter compared to said driven member to thereby provide a relatively large moment arm for manually rotating said members to adjust the clutch engagement force exerted by said clutch spring.

9. In an operating mechanism having means for operably connecting said mechanism to an overhead door for causing movement thereof between closed and open positions, the combination comprising a rotatable spindle operably connected in driving relation with said connecting means, said spindle having a drive member journalled thereon for rotational and axial movement relative thereto, a first clutch member in driven engagement with said drive member, a second clutch member threadably connected to said spindle, friction means interposed between said clutch members for transmitting torque therebetween, a clutch spring oriented for developing force in the direction of the axis of said spindle and having one end fixed relative to said spindle and the other end operably connected to bias said drive and first clutch members into operative engagement with said second clutch member via said friction means and keying means releasably connecting said second clutch member with said spindle for rotation herewith, said keying means being manually movable to disconnect said second clutch member from said spindle to permit relative rotation therebetween for causing aixal travel of all of said members to thereby vary the clutch engagement force exerted by said clutch spring.

10. The combiantion recited in claim 9 wherein said operating mechanism includes an electric motor and a speed reducing drive train including said drive member for connecting said motor in driving relation with said spindle, said drive member comprising a large diameter element of said speed reducing drive train to thereby provide a relatively large moment arm for manually rotating said members to adjust the clutch engagement force exerted by said clutch spring.

11. The combination recited in claim 9 including an electric motor having a drive shaft disposed parallel with said spindle, a pulley mounted on said drive shaft for rotation therewith, said drive member comprising another pulley having a substantially larger diameter than said first pulley, and a V-belt trained around said pulleys to thereby provide a speed reducing driving connection of said motor to said spindle, said second pulley being located on said spindle so that it is normally in alignment with said first pulley at substantially the mean axial adjustment of said clutch spring.

12. In an overhead door operator having an overhead track adapted to support a carriage thereon for generally horizontal movemnt lengthwise thereof, means for connecting the carriage with the door for raising and lowering the door in response to movement of the carriage along the track, and a flexible element connected to said carriage for causing said movement of said carriage, the combination including a vertical spindle supported for rotation beyond one end of the path of travel of the carriage, a drive member mounted on said spindle for rotation therewith and connected in driving relation with the flexible element, a relatively large diameter driven pulley journalled on said spindle for rotational and axial movement relative thereto in an exposed position below the track, an upper cluch plate adapted for driven engagement with the underside of said pulley and for rotational and axial movement relative to said spindle, a lower clutch plate below said upper clutch plate, means threadably received on said spindle for supporting said lower clutch plate against downward movement and being connected thereto for rotation therewith, friction means interposed between said plates for transmiting torque therebetween, a cluch spring coiled around said spindle with the upper end thereof fixed against axial movement relative thereto and with the lower end operably connected for yieldably biasing said pulley and said upper clutch plate downward towards said lower clutch plate, a finger grip bracket slidably keyed on said spindle below said lower clutch plate, said bracket having means adapted for operably connecting said lower clutch plate for rotation with said bracket at the upper limit of its vertical movement, and a spring mounted on the lower end of said spindle for yieldably urging said bracket upwardly into said connected relation with said lower clutch plate.

References Cited by the Examiner
UNITED STATES PATENTS

| | | | |
|---|---|---|---|
| 2,070,058 | 2/1937 | McCloud | 268—59 |
| 2,757,327 | 7/1956 | Oliver | 318—475 X |
| 2,922,638 | 1/1960 | Smith | 268—59 |

HARRISON R. MOSELEY, *Primary Examiner.*

CHARLES E. O'CONNELL, *Examiner.*